Oct. 26, 1943.   J. C. McCUNE   2,332,585
FLUID MOTOR MECHANISM
Filed Oct. 31, 1941

INVENTOR
Joseph C. McCune
BY
ATTORNEY

Patented Oct. 26, 1943

2,332,585

UNITED STATES PATENT OFFICE 2,332,585

FLUID MOTOR MECHANISM

Joseph C. McCune, Edgewood, Pa., assignor to The Westinghouse Air Brake Company, Wilmerding, Pa., a corporation of Pennsylvania Application October 31, 1941, Serial No. 417,268

6 Claims. (Cl. 60—62.6)

This invention relates to fluid motor mechanism and more particularly to ring type brake cylinder devices such as used in connection with disk type of brake mechanism.

In disk brake mechanism the brake cylinder device is usually connected directly to the braking disks which in turn are generally associated directly with the member to be braked. When such a mechanism is therefore applied to railway vehicles, the brake cylinder device along with the braking disks are more or less intimately associated with the wheels and axles to be braked and thus are subject directly to dirt, moisture and other foreign matter incident to such a location. The entrance of foreign matter into the brake cylinder device is undesirable on account of wear or corrosion which may result therefrom. The principal object of the invention is therefore the provision of an improved ring type fluid motor mechanism embodying means for excluding foreign matter therefrom.

Other objects and advantages will be apparent from the following more detailed description of the invention.

Figure 1:
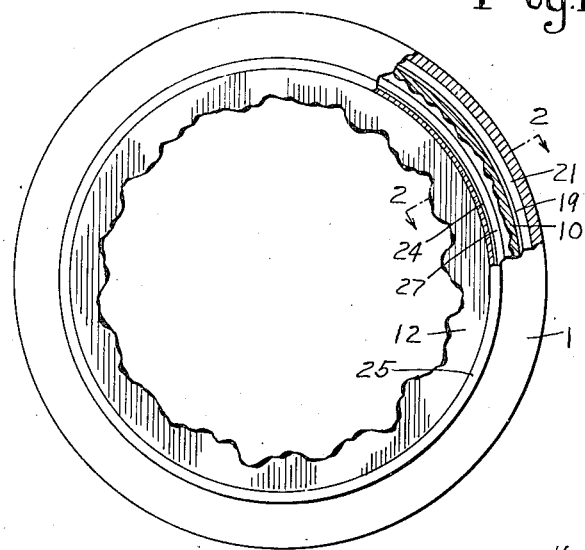
Figure 2:
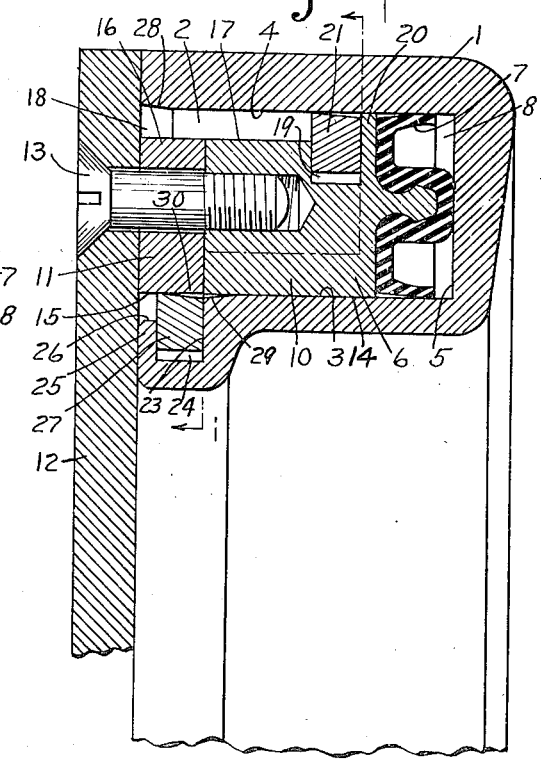
Figure 3:
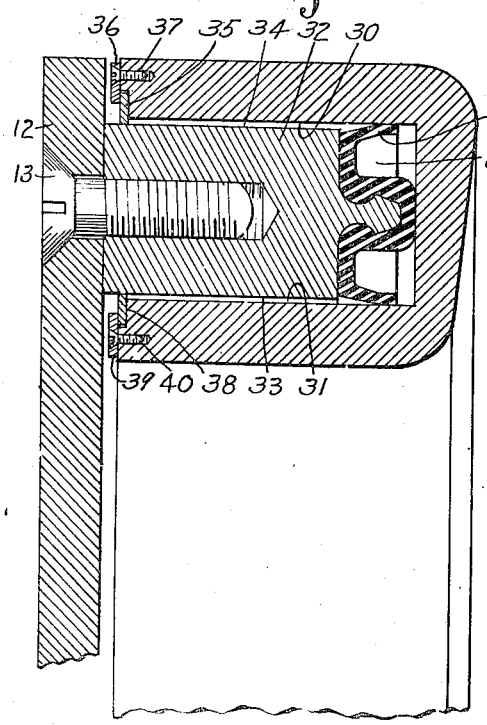

In the accompanying drawing, Fig. 1 is an end view partly in section of a portion of a disk brake mechanism embodying a ring type brake cylinder device constructed in accordance with one form of the invention, the sectional part being taken on line 1—1 in Fig. 2; Fig. 2 is a sectional view taken on the line 2—2 in Fig. 1; and Fig. 3 is a view similar to Fig. 2 but showing another form of the invention.

*Description—Figs. 1 and 2*

In Figs. 1 and 2 the reference numeral 1 indicates a brake cylinder casing which is annular in form and which is provided with a ring shaped piston bore 2 having inner and outer concentric and cylindrical cylinder walls or surfaces 3 and 4, respectively. These walls are joined at one end to a radial wall 5 which constitutes the pressure end of the bore. The opposite end of the piston bore is open through the end of the casing.

A ring shaped brake cylinder piston 6 is slidably mounted in the bore 2. On the inner end of piston 6 is a flexible packing cup 7 which cooperates with the end wall 5 of the piston bore to form a pressure chamber 8 to which fluid under pressure is adapted to be supplied for effecting relative parting movement between the piston 6 and casing 1 for applying brakes. Release of fluid under pressure from the chamber 8 is adapted to provide for relative movement between the piston and casing in the opposite direction, i. e., telescoping movement, to provide for a release of brakes. Either the casing 1 or piston 2 may be the stationary part of the brake cylinder device while the other part will be the part capable of relative movement, as above described. This however is immaterial in so far as the invention is concerned, as will be apparent.

According to this embodiment of the invention, the piston 6 comprises an inner annular part 10 engaging the packing cup 7 and an outer annular part 11 having one end engaging the adjacent end of the part 10. The opposite end of the outer part is engaged by a member 12 which may constitute either a support for the brake cylinder device or a braking pressure transmitting member movable by the brake cylinder piston 6. One or more screws 13 extend through suitably aligned bores in the member 12 and annular part 11 into a screwthreaded bore in the annular part 10 for rigidly securing said member and two parts together. With the brake cylinder piston in its brake release position shown, the member 12 substantially engages the casing around the open end of bore 2.

The inner and outer parts 10 and 11 of the brake cylinder piston have respectively, inner, axially aligned, cylindrical bearing surfaces 14 and 15 having substantial sliding contact with the inner cylinder wall 3, and outer axially aligned cylindrical surfaces 16 and 17 formed at a diameter less than that of the outer cylinder wall 4 in order to provide a space or chamber 18 for receiving foreign matter without such foreign matter being forced into contact with the cylinder wall 4.

The outer surface 17 on the inner part 10 of the piston terminates at one side of a ring groove 19, the opposite side of which is formed by an annular part 20 of the piston which bears against and supports the back of the packing cup 7 and which is of such diameter as to have substantial sliding contact with the outer cylinder wall 4.

An expansion scraper ring 21 is mounted in the groove 19 and bears against the outer cylinder wall 14. The outer surface 17 of the piston part 10 being of the diameter above mentioned facilitates the application of ring 21 to the groove 19 without breaking same.

Upon parting movement of the piston 6 and casing 2, the ring 21 is adapted to scrape foreign matter from the outer cylinder wall 4 and push same ahead of the ring toward the open end of the cylinder. The outer surface of ring 21 is tapered away from the cylinder wall 4 in the direction of the packing cup 7, and the purpose of this is to allow the ring to move or slide over any foreign matter which may be on the cylinder wall 4 upon telescopic movement of the piston and cylinder. By this arrangement the cylinder wall 4 on the side of the ring 21 adjacent the packing cup 7 will at all times be maintained as free as possible of foreign matter so as to minimize wear.

The inner cylinder wall 3 is shorter than the outer cylinder wall 4 in that it terminates at the inner side wall 23 of a ring groove 24 in the casing. The outer side wall of the groove 24 is formed in an annular extension 25 of the casing which is engaged by the member 12 with the piston 6 in release position. The inner peripheral surface 26 of extension 25 is formed at a less diameter than the inner cylinder wall 3 in order to facilitate the mounting of an expansion ring 27 in the ring groove 24.

It will be noted that ring 27 is disposed in the casing while ring 21 is mounted in the piston and this is desirable in order to avoid unnecessary weakening of the piston as would result if a second ring groove were provided in the piston to open at the inner surface of the piston.

Upon telescopic movement of piston 6 and casing 2 it will be apparent that the ring 27 engaging the inner surface of the piston will remove foreign matter therefrom and thus prevent its entrance into the cylinder where it would tend to cause undue wear. The surface of ring 27 engaging the piston is tapered like that of ring 21 so that upon parting movement of the piston and casing, the ring 27 will tend to ride over any foreign matter which may be present on the inner piston surfaces 15, and 14. After such riding over foreign matter by both scraper rings 21 and 27 it will be seen that upon subsequent relative movement between the parts in the opposite direction said rings will tend to remove said foreign matter from the surfaces in sliding contact with the rings and thus prevent entry thereof to the interior of the brake cylinder device.

The member 12 closing the open end of the piston bore with the piston 6 in its release position acts to prevent the entrance of foreign matter into the open end of piston bore 2, and since this is the position said member will occupy the greater portion of the time the device is in use, the amount of foreign matter which may be obtained in the piston bore to be removed by the scraper rings 21 and 27 and thereby excluded from the packing cup 7 will not be great.

The length of the inner annular part 10 of the piston is such that with the piston in its release position shown, said part will not overlap the scraper ring groove 24. Adjacent the outer ends of the cylinder walls 3 and 4 there are provided outwardly flaring wall parts 28 and 29, respectively. The inner surface 15 on the outer part 11 of the piston is joined at its inner end to a beveled surface 30 which is tapered inwardly in the direction of the inner part 10, these details of structure being essential to facilitate mounting of the piston 6 in the piston bore 2, which will now be described.

To assemble the piston 6 in bore 2, the screw 13 must be removed for separating the piston parts 10 and 11 and the member 12. Also the scraper ring 27 must be removed from the groove 24. The ring 21 and packing cup 7 are then applied to the piston part 10 and this assembly is mounted in the piston bore to the position shown in the drawing in which no part of the ring groove 24 is covered by the piston part 10. The tapered surfaces 28 and 29 at the open end of the piston bore are adapted to compress the leading edges of the packing cup 7 and also the scraper ring 21 to facilitate mounting of these parts in the piston bore 2.

The scraper ring 27 is next expanded over surface 26 on the casing and slipped to the groove 24 into which it contracts. The outer part 11 of the piston is then mounted over the scraper ring 27 which compresses said ring to its working position, the tapered surface 16 on said part facilitating this operation. Then the member 12 is mounted against the outer part 11 of the piston and the screw 13 applied for securing the two parts of the piston together and to said member.

*Description—Fig. 3*

In the embodiment shown in Fig. 3, the brake cylinder casing has a piston bore with inner and outer concentrically arranged cylindrical cylinder walls 30 and 31 of the same length, and in this bore is slidably mounted a one-piece brake cylinder piston 32 which is connected by screw 13 to member 12. The piston 32 has inner and outer cylindrical bearing surfaces 33 and 34, respectively, arranged in concentric relation with the cylinder walls 30 and 31. The piston is of such length that in its release position it projects slightly beyond the open end of the piston bore. In the drawing relative great clearance is shown between the piston surfaces 33 and 34 and the adjacent cylinder walls 31 and 30 in order to clearly illustrate the invention. These clearances however need be no different from normal and in practice might be the same as would be employed in connection with the embodiment shown in Figs. 1 and 2 as above described.

A contracting scraper ring 35 is tensioned around the piston 32 in contact with the bearing surface 34 and is disposed in a recess provided in the end of the casing. This ring is held in place by a retaining member 36 secured by a screw 37 to the casing. An expanding scraper ring 38 is disposed in a recess in the part of the casing encircled by the piston for sliding contact with the inner bearing surface 33 of the piston, and this ring is held in place by a retaining member 39 secured to the casing by screw 40.

The two scraper rings 35 and 38 are preferably of metal and relatively thin to provide relatively narrow bearing contacts with the outer and inner surfaces 34 and 33 of the piston so as to minimize the possibility of foreign matter wedging itself past said rings.

In operation it will be apparent that the scraping action of rings 35 and 38 on the two bearing surfaces 33 and 34 of the piston 32 upon telescoping of the piston and casing will act to remove foreign matter from said surfaces before the surfaces enter the piston bore, so as to thereby minimize the entrance of foreign matter into said bore.

Having now described my invention, what I claim as new and desire to secure by Letters Patent, is:

1. A fluid motor mechanism comprising in combination, two telescopically associated parts, one of said parts constituting a casing having an annular piston bore closed at one end and open at the opposite end, said bore having inner and outer concentrically arranged cylinder surfaces, and the other part constituting an annular piston mounted in said bore between said surfaces and having inner and outer surfaces in concentric relation with said cylinder surfaces, two expansive scraper rings, one encircling and the other encircled by said piston, each of said rings having a rigid scraping edge and being secured to one of said parts with its scraping edge in scraping contact with the adjacent said inner or outer surface of the said other part, both of said rings being operative upon relative movement between said two parts to block passage of foreign matter past said rings in the direction of said closed end of said bore.

2. A fluid motor mechanism comprising in combination, two telescopically associated parts, one of said parts constituting a casing having an annular piston bore closed at one end and open at the opposite end, said bore having inner and outer concentrically arranged cylinder surfaces, and the other part constituting an annular piston mounted in said bore between said surfaces and having inner and outer surfaces in concentric relation with said cylinder surfaces, two scraper rings, one encircling and the other encircled by said piston, each of said rings being secured to one of said parts and having scraping contact with the adjacent said inner or outer surface of the said other part, both of said rings being so designed and arranged as to scrape foreign matter from the surfaces engaged upon relative movement between the parts which would tend to carry foreign matter into the spaces between said rings and the closed end of said bore and to slide over foreign matter on said surfaces upon relative movement in the reverse direction.

3. A fluid motor mechanism comprising in combination, two telescopically associated parts, one of said parts constituting a casing having an annular piston bore closed at one end and open at the opposite end, said bore having inner and outer concentrically arranged cylinder surfaces, and the other part constituting an annular piston mounted in said bore between said surfaces and having inner and outer surfaces in concentric relation with said cylinder surfaces, a scraper ring carried in said piston and tensioned into scraping contact with said outer surface of said bore, a scraper ring carried by said casing and tensioned into scraping contact with said inner surface of said piston, said rings being operative upon relative movement between said two parts to scrape foreign matter from the contacted surfaces and thereby block passage of same into the spaces between said rings and the closed end of said bore.

4. A fluid motor mechanism comprising in combination, two telescopically associated parts, one of said parts constituting a casing having an annular piston bore closed at one end and open at the opposite end, said bore having inner and outer concentrically arranged cylinder surfaces, and the other part constituting an annular piston mounted in said bore between said surfaces and having inner and outer surfaces in concentric relation with said cylinder surfaces, a scraper ring carried by and extending through one of said surfaces of said piston and tensioned into scraping contact with the adjacent surface of said bore, another scraper ring carried by said casing and extending through the other surface of said bore and tensioned into scraping contact with the other surface of said piston, said rings being operative upon relative movement between said two parts to scrape foreign matter from the contacted surfaces for preventing passage of such foreign matter into the spaces between said rings and the closed end of said bore, the peripheries of said rings in scraping contact with the respective surfaces of said casing and piston being tapered to ride over foreign matter on such surfaces upon relative movement between said two parts opposite that in which said rings scrape foreign matter from such surfaces.

5. A fluid motor mechanism comprising in combination, two telescopically associated parts, one of said parts constituting a casing having an annular piston bore closed at one end and open at the opposite end, said bore having inner and outer concentrically arranged cylinder walls, and the other part constituting an annular piston mounted in said bore between said walls and having inner and outer surfaces arranged in concentric relation with said walls, said casing having at the open end a radially extending ring groove opening at the outer end of one of said walls, said piston comprising an inner part adapted to be positioned toward the closed end of said bore beyond said groove, said inner part of said piston having at the end adjacent the closed end of said bore a radially extending ring groove open to the surface thereof adjacent the other cylinder wall, a scraper ring in the last named ring groove tensioned radially into scraping contact with the said other cylinder wall, said piston comprising an annular outer part, means removably securing said outer part to said inner part, and a scraper ring in the ring groove in said casing tensioned radially into contact with the adjacent piston surface.

6. A fluid motor mechanism comprising in combination, two telescopically associated parts, one of said parts constituting a casing having an annular piston bore closed at one end and open at the opposite end, said bore having inner and outer concentrically arranged cylinder walls, and the other part constituting an annular piston mounted in said bore between said walls and having inner and outer surfaces arranged in concentric relation with said walls, said casing having at the open end a radially extending ring groove opening at the outer end of one of said walls, said piston comprising an inner part adapted to be positioned toward the closed end of said bore beyond said groove, said inner part of said piston having at the end adjacent the closed end of said bore a radially extending ring groove open to the surface thereof adjacent the other cylinder wall, a scraper ring in the last named ring groove tensioned radially into scraping contact with the said other cylinder wall, said piston comprising an annular outer part, means removably securing said outer part to said inner part, and a scraper ring in the ring groove in said casing tensioned radially into contact with the adjacent piston surface, the surface of said inner part of said piston at the side of the ring therein adjacent the closed end of said bore being of substantially the same diameter as the adjacent cylinder wall but at the opposite side of said ring of a different diameter to provide a space therebetween and the adjacent cylinder wall and to facilitate mounting the piston ring in the piston ring groove.

JOSEPH C. McCUNE.